(12) United States Patent
Kudoh

(10) Patent No.: US 9,465,190 B2
(45) Date of Patent: Oct. 11, 2016

(54) LENS BARREL AND IMAGE PICKUP APPARATUS

(71) Applicant: CANON KABUSHIKI KAISHA, Tokyo (JP)

(72) Inventor: Tomoyuki Kudoh, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 14/562,141

(22) Filed: Dec. 5, 2014

(65) Prior Publication Data

US 2015/0160428 A1    Jun. 11, 2015

(30) Foreign Application Priority Data

Dec. 9, 2013   (JP) ................................ 2013-253720

(51) Int. Cl.
*H04N 5/225* (2006.01)
*G02B 7/10* (2006.01)

(52) U.S. Cl.
CPC ............ *G02B 7/102* (2013.01); *H04N 5/2254* (2013.01)

(58) Field of Classification Search
CPC ...... H04N 5/2254; G02B 17/04; G02B 7/10; G02B 7/102
USPC ............ 348/335, 373, 360, 240.3, 345, 374; 396/348, 349; 359/817
See application file for complete search history.

(56) References Cited

U.S. PATENT DOCUMENTS

| | | | | |
|---|---|---|---|---|
| 2011/0002050 A1* | 1/2011 | Nomura | ................. | G02B 7/102 359/696 |
| 2011/0026137 A1* | 2/2011 | Kato | ..................... | G02B 7/021 359/700 |
| 2011/0157729 A1* | 6/2011 | Yamauchi | .............. | G02B 7/102 359/817 |
| 2011/0181768 A1* | 7/2011 | Nomura | ............... | H04N 5/2254 348/340 |
| 2011/0188842 A1* | 8/2011 | Masuki | .................. | G03B 17/00 396/72 |
| 2013/0242390 A1* | 9/2013 | Nomura | ................. | G02B 7/006 359/483.01 |
| 2013/0258507 A1* | 10/2013 | Uno | ........................ | G02B 7/04 359/827 |

FOREIGN PATENT DOCUMENTS

JP     2008-033153 A     2/2008
JP     2011-154167 A     8/2011

* cited by examiner

*Primary Examiner* — Nhan T Tran
(74) *Attorney, Agent, or Firm* — Cowan, Liebowitz & Latman, P.C.

(57) ABSTRACT

A lens barrel 16 includes a movable cam ring 8, and a first lens holder 1*b* holding a first lens unit 1*a* and configured to follow a cam groove 8*f* formed on the movable cam ring 8, and the first lens holder 1*b* is provided with an opening 1*c* into which at least part (a protrusion 8*c*) of the movable cam ring 8 is insertable.

7 Claims, 6 Drawing Sheets

LENS BARREL AND IMAGE PICKUP APPARATUS

BACKGROUND OF THE INVENTION

1. Field of the Invention

The present invention relates to an image pickup apparatus including a lens barrel.

2. Description of the Related Art

A conventional image pickup apparatus includes a zoom mechanism configured to move a plurality of optical lenses in an optical axis direction so as to change imaging magnification. Japanese Patent Laid-open No. 2008-33153 discloses a lens barrel configured to move a plurality of lens holders holding a plurality of lenses in the optical axis direction by a cam ring and to regulate movement of the lens holders in a rotational direction by a rotation regulator. Such a configuration allows the optical lenses to be moved to desired positions. The lens barrel disclosed in Japanese Patent Laid-open No. 2008-33153 is configured to allow part of a straight barrel to be inserted into space left by retracted barriers, penetrating from a back of the lens barrel to a front thereof. Japanese Patent Laid-open No. 2011-154167 discloses a lens barrel configured to allow lenses to be inserted into an opening formed by barriers at image capturing.

In recent years, a lens barrel has been required to be small and to have as long its length in an extended state as possible.

In such a configuration disclosed in Japanese Patent Laid-open No. 2008-33153, the penetration of the straight barrel to the front of the lens barrel contributes increasing a straight move amount of units inside thereof. However, the configuration cannot have long cam grooves, which limits its cam stroke. In the configuration disclosed in Japanese Patent Laid-open No. 2011-154167, a barrier unit and a first lens unit are separated in two. This separation increases a thickness of the configuration in an optical axis direction and thus decreases a length of a cam barrel accordingly, which results in a shorter cam stroke.

Recent developments have further downsized image pickup apparatuses (cameras), and small image pickup apparatuses are most needed in the market. It is thus needed to configure a lens barrel having high optical magnification while avoiding increasing the size of an image pickup apparatus, which is achieved by providing a long cam stroke.

SUMMARY OF THE INVENTION

The present invention provides a lens barrel and an image pickup apparatus that have long cam strokes.

A lens barrel as one aspect of the present invention includes a movable cam ring and a first lens holder holding a first lens unit and configured to follow a first cam groove formed on the cam ring, and the first lens holder is provided with an opening into which at least part of the cam ring is insertable.

An image pickup apparatus as another aspect of the present invention includes an image pickup element configured to perform photoelectric conversion on an optical image and to output an image signal, and the lens barrel.

Further features and aspects of the present invention will become apparent from the following description of exemplary embodiments with reference to the attached drawings.

DESCRIPTION OF THE EMBODIMENTS

Figure 1A:
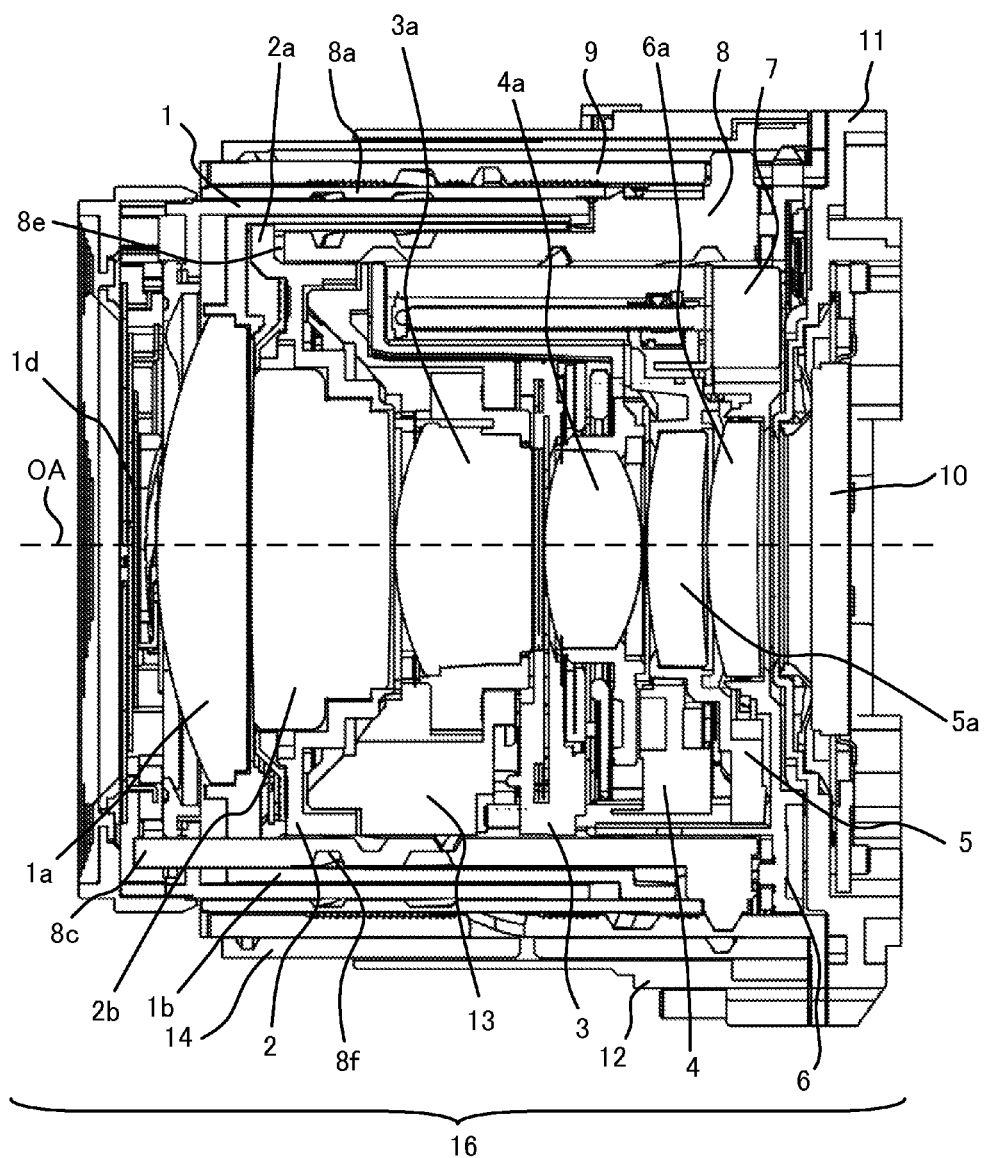
FIG. 1A is a cross-sectional view of a lens barrel in a retracted state in an embodiment of the present invention.

Exemplary embodiments of the present invention will be described below with reference to the accompanied drawings. In each of the drawings, the same elements will be denoted by the same reference numerals and the duplicate descriptions thereof will be omitted.

Figure 5A:
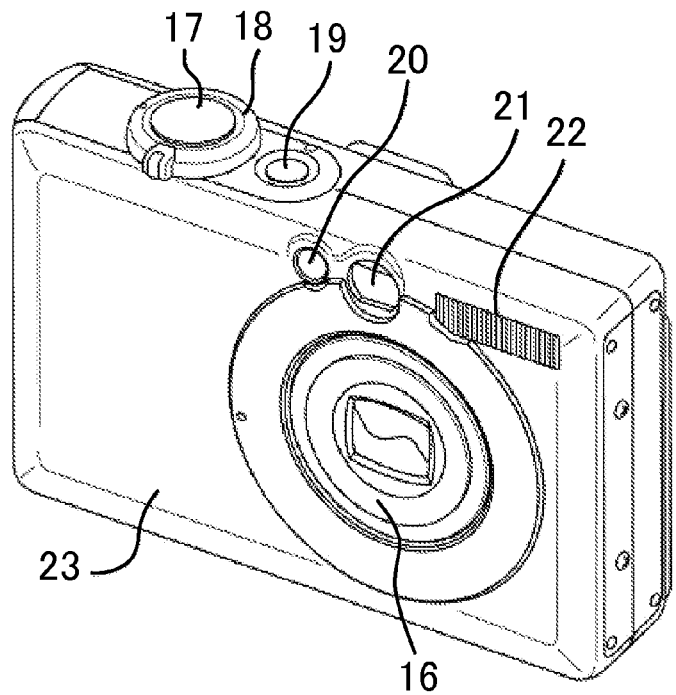
FIG. 5A is an external perspective view of an image pickup apparatus including the lens barrel in the embodiment.
Figure 5B:
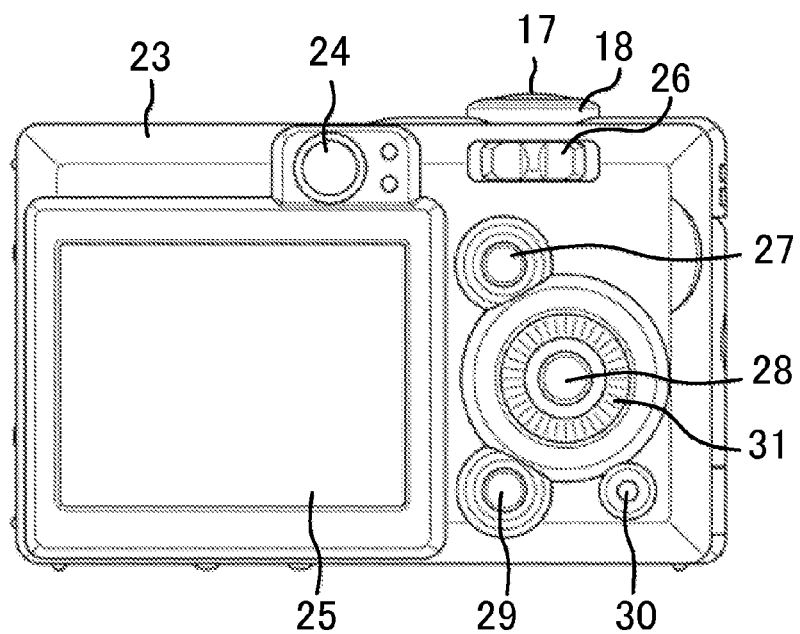
FIG. 5B is a back view of the image pickup apparatus in the embodiment.
Figure 6:
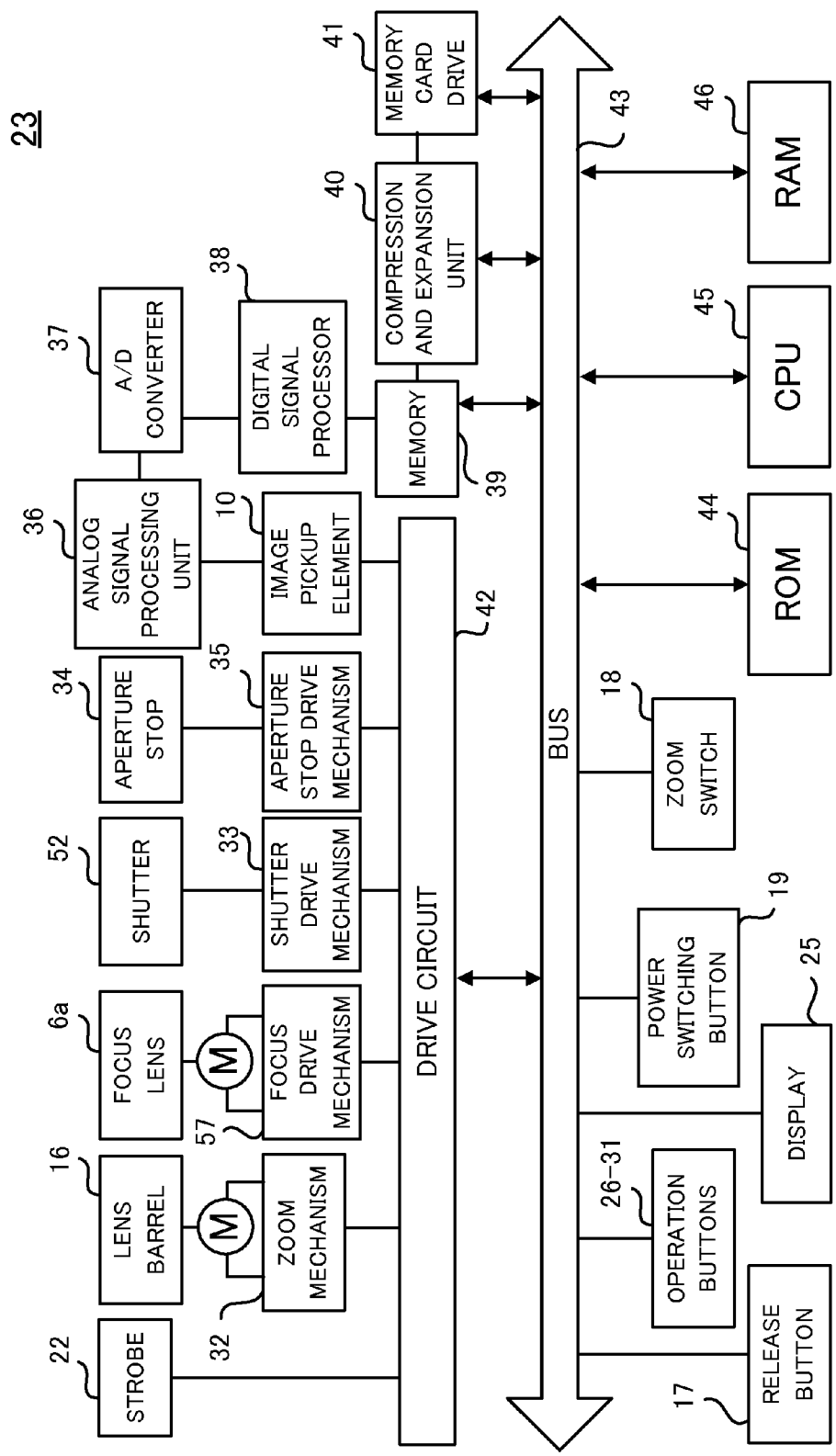
FIG. 6 is a control block diagram of the image pickup apparatus in the embodiment.

First, referring to FIGS. 5A, 5B, and 6, an image pickup apparatus including a lens barrel in an embodiment of the present invention will be described. FIG. 5A is an external perspective view of the image pickup apparatus (a digital camera 23). FIG. 5B is a back view of the image pickup apparatus. FIG. 6 is a control block diagram of the image pickup apparatus. The digital camera 23 in the present embodiment includes a zoom mechanism that moves a lens unit between an image capturing position and a retracted position in an optical axis direction so as to change imaging magnification.

As illustrated in FIG. 5A, the digital camera 23 includes, on its front face, a finder 21 used for setting composition of an object, an auxiliary light source 20 used in metering and ranging, a strobe 22, and a lens barrel 16 (lens barrel unit). The digital camera 23 includes, on its top face, a release button 17, a zoom switch 18, and a power switching button 19. As illustrated in FIG. 5B, the digital camera 23 includes, on its back face, operation buttons 26 to 31, a display 25 (LCD unit) such as an LCD, and a finder eye piece 24.

The display 25 (image display unit) displays thereon image data stored in a memory 39 and image data read from a memory card. A controller (control system) includes a CPU 45, a ROM 44, and a RAM 46. The controller is connected through a bus 43 to various components such as the release button 17, the operation buttons 26 to 31, the display 25, the memory 39, and a memory card drive 41.

A drive circuit 42 is connected to the controller through the bus 43. The drive circuit 42 is connected to a zoom mechanism 32, a focus drive mechanism 57, a shutter drive mechanism 33, an aperture stop drive mechanism 35, an image pickup element 10 such as a CCD and a CMOS, and the strobe 22. The zoom mechanism 32 drives the lens barrel 16 (lens barrel unit) through a motor. The focus drive mechanism 57 drives a focus lens 6a through a motor. The shutter drive mechanism 33 drives a shutter 52. The aperture stop drive mechanism 35 drives an aperture stop 34. The image pickup element 10 performs photoelectric conversion on an optical image (object image) to output an image signal. Such a configuration enables the drive circuit 42 to control drive of each component based on a signal from the controller (CPU 45).

The ROM 44 stores various control programs that control the components. The RAM 46 stores data needed for the control programs. An analog signal processing unit 36 performs analog processing on image data output from the image pickup element 10 and outputs the image data to an A/D converter 37. The A/D converter 37 converts analog data obtained from the image pickup element 10 into digital data and outputs the digital data to a digital signal processor 38. The digital signal processor 38 performs predetermined processing on the digital data converted by the A/D converter 37 and outputs the digital data as image data to the memory 39. The image data is then stored in the memory 39.

The image data stored in the memory 39 is provided with compression processing into formats such as JPEG and TIFF by a compression and expansion unit 40 in accordance with an operation of the operation button 27. The image data provided with the compression processing by the compression and expansion unit 40 is output to the memory card mounted to the memory card drive 41 and stored therein. The compression and expansion unit 40 performs expansion processing on the image data stored in the memory 39 and the image data stored in the memory card. The image data provided with the expansion processing can be displayed on the display 25 (display unit) through the bus 43. When an image displayed on the display 25 is not needed, a user can delete the image through an operation of the operation button 28.

Figure 1B:
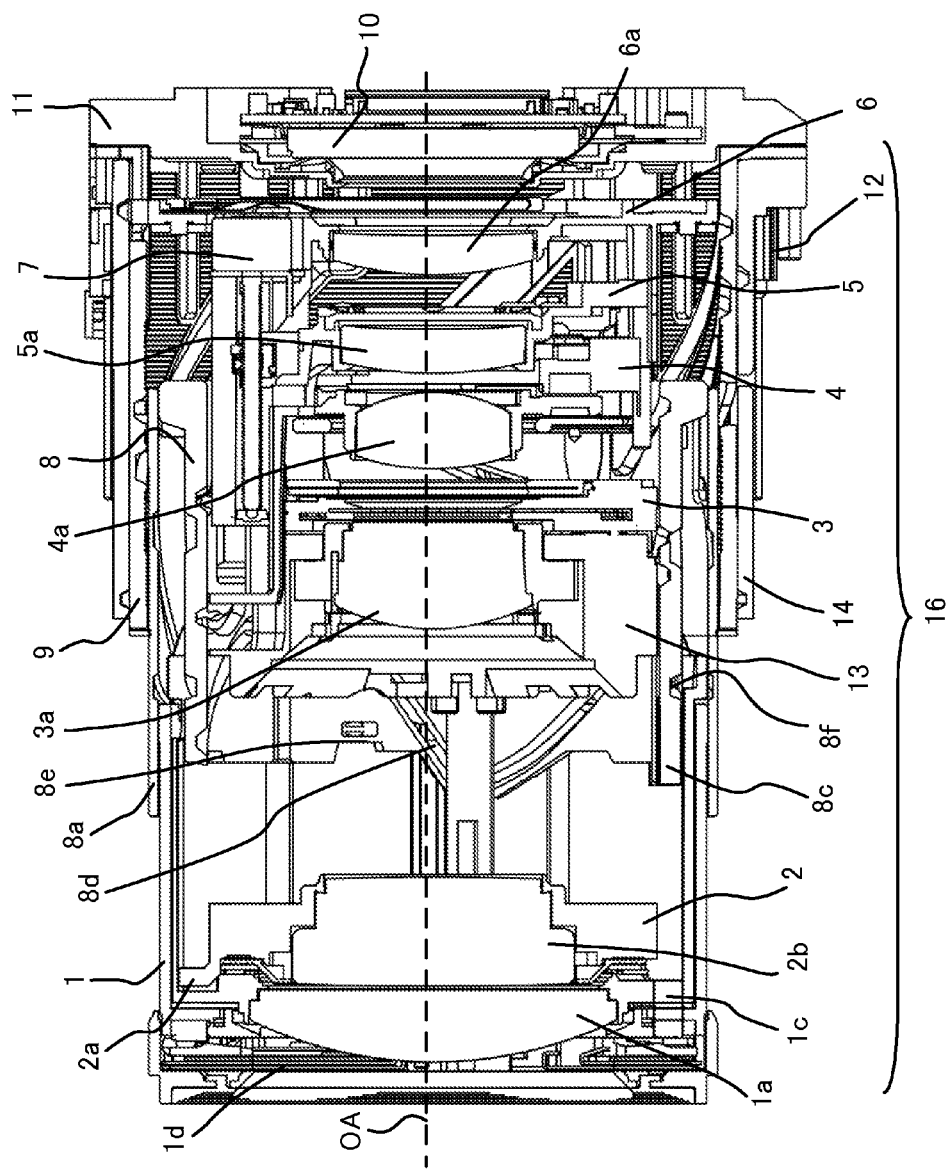
FIG. 1B is a cross-sectional view of the lens barrel in an extended state in the embodiment.
Figure 2:
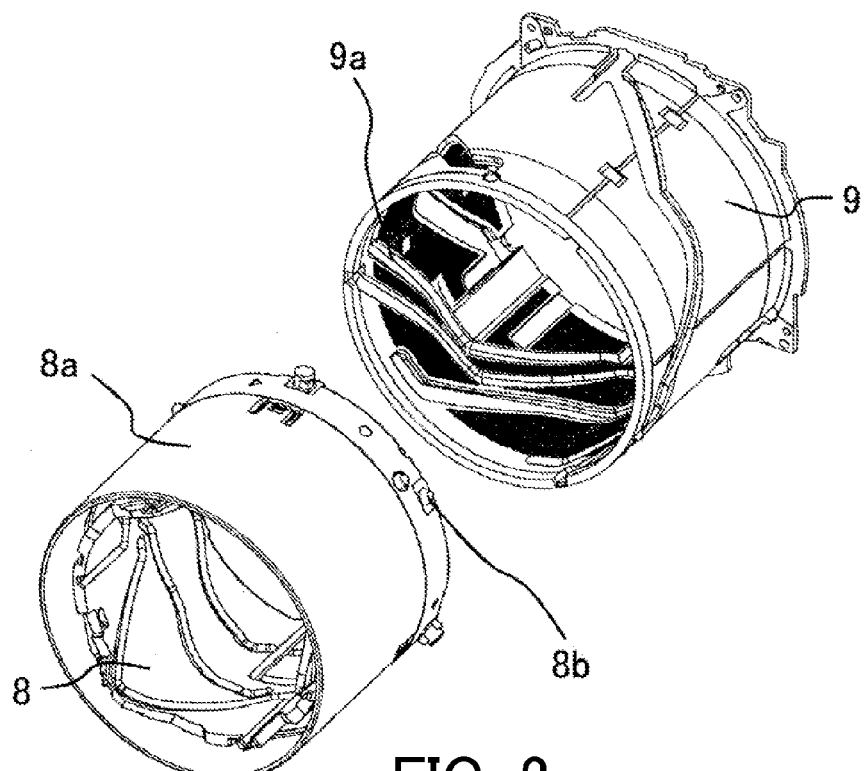
FIG. 2 is a perspective view of a movable cam ring and a fixed cam ring of the lens barrel in the embodiment.
Figure 3:
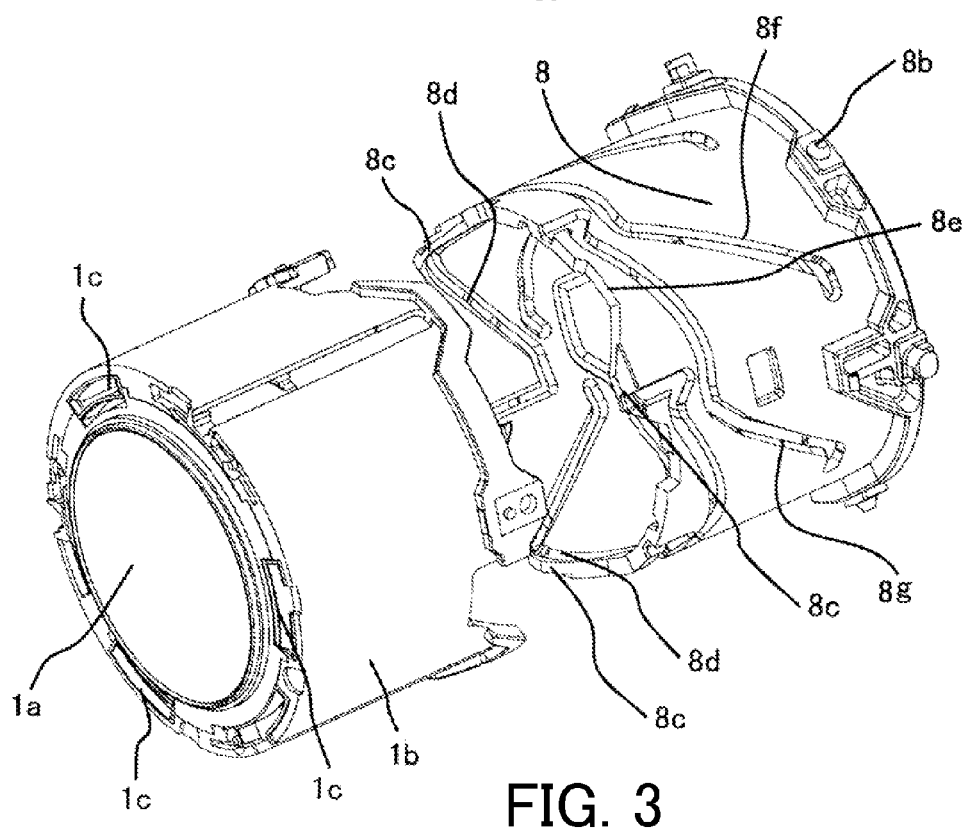
FIG. 3 is a perspective view of a first lens unit and the movable cam ring of the lens barrel in the embodiment.
Figure 4:
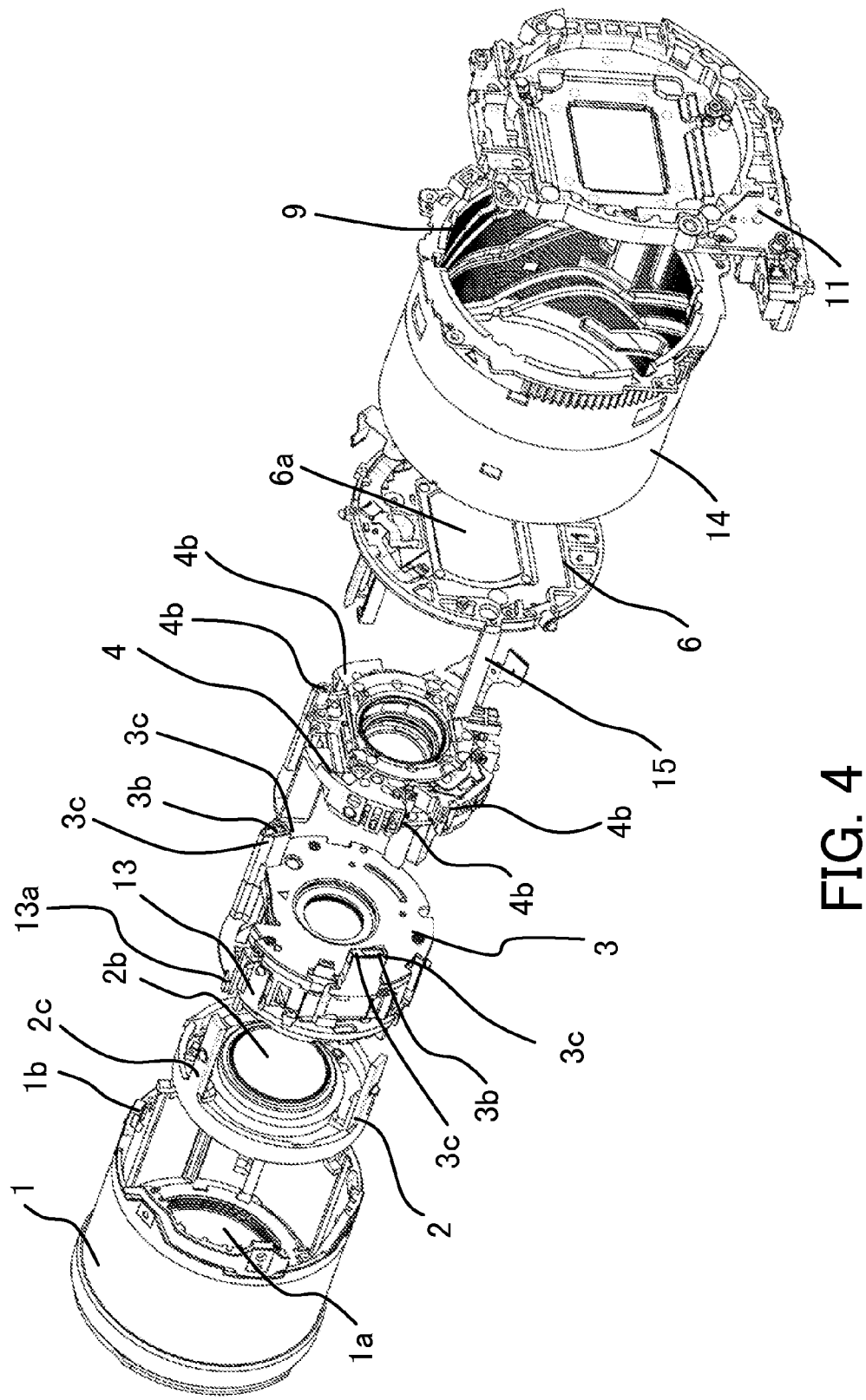
FIG. 4 is an exploded perspective view of the lens barrel in the embodiment.

Next, referring to FIGS. 1A and 1B to 4, a configuration of the lens barrel 16 in the present embodiment will be described. FIG. 1A is a cross-sectional view of the lens barrel 16 in a retracted state. FIG. 1B is a cross-sectional view of the lens barrel 16 in an extended state. FIG. 2 is a perspective view of a movable cam ring 8 and a fixed cam ring 9 of the lens barrel 16. FIG. 3 is a perspective view of a first lens unit 1a and the movable cam ring 8 of the lens barrel 16. FIG. 4 is an exploded perspective view of the lens barrel 16.

The lens barrel 16 holds the first lens unit 1a by a first lens holder 1b. The first lens holder 1b has a barrier unit 1 disposed in front thereof (on left sides in FIGS. 1A and 1B; on an object side thereof). The first lens holder 1b has a second lens holder 2, which holds a second lens unit 2b, disposed behind it (on right sides of FIGS. 1A and 1B; on an image side thereof). The second lens holder 2 has a third lens holder 3, which holds a third lens unit 3a, disposed behind it (on the image side thereof). The third lens holder 3 includes a third lens holder 13 holding the third lens unit 3a, and a shutter unit disposed behind (on the image side of) the third lens unit 3a.

The third lens holder 3 has a fourth lens holder 4, which holds a fourth lens unit 4a that is an image stabilizing lens unit, disposed behind it. The fourth lens holder 4 has a fifth lens holder 5 (focus lens holder), which holds a focus lens 5a, disposed behind it. The fifth lens holder 5 has a sixth lens holder 6, which holds a sixth lens unit 6a, disposed behind it. The sixth lens holder 6 has a focus motor 7 mounted to a focus base thereof, and the focus motor 7 is configured to move the fifth lens holder 5 in a direction of an optical axis OA (the optical axis direction) to perform focusing (focus control).

The second lens holder 2, the third lens holder 3, and the fourth lens holder 4 have the movable cam ring 8 disposed on an outer periphery thereof. The second lens holder 2, the third lens holder 3, and the fourth lens holder 4 are configured to be movable in the optical axis direction following a plurality of cam grooves formed on an inner periphery of the movable cam ring 8. The first lens holder 1b is configured to be movable in the optical axis direction following a cam groove 8f (first cam groove) formed on an outer periphery of the movable cam ring 8.

The barrier unit 1 is disposed on an outer periphery of the first lens holder 1b. The barrier unit 1 is configured to follow a cam groove 8g (second cam groove) different from the cam groove 8f followed by the first lens holder 1b disposed on the outer periphery of the movable cam ring 8. Thus, the first lens holder 1b and the barrier unit 1 have movement loci different from each other.

The movable cam ring 8 has the fixed cam ring 9 disposed on the outer periphery thereof. The movable cam ring 8 is configured to be movable in the optical axis direction following a cam groove formed on an inner periphery of the fixed cam ring 9. The fixed cam ring 9 has a drive ring 14 disposed on an outer periphery thereof. The drive ring 14 has an outer periphery thereof protected by a covering barrel 12. The lens barrel 16 has the image pickup element 10 disposed on a backmost face (on the image side) thereof. The image pickup element 10 is held by an image pickup element holder 11. The sixth lens holder 6 is configured to follow a cam groove formed on an inner periphery of the drive ring 14. The sixth lens holder 6 is regulated to move straight by the fixed cam ring 9. The zoom mechanism 32 rotates the drive ring 14 on an outer periphery of the fixed cam ring 9 so as to move the sixth lens holder 6 back and forth along the cam groove in the optical axis direction.

The rotation of the drive ring 14 accordingly rotates the movable cam ring 8 on the inner periphery of the fixed cam ring 9. The movable cam ring 8 is moved back and forth in the optical axis direction through a movable cam ring follower 8b, which is provided to the movable cam ring 8, following a fixed cam groove 9a of the fixed cam ring 9 during the rotation. The rotation of the movable cam ring 8 moves the barrier unit 1, the first lens holder 1b, the second lens holder 2, the third lens holder 3, the fourth lens holder 4, and the sixth lens holder 6 in the optical axis direction.

The focus base of the sixth lens holder 6 is integrated with a straight movement regulator 15. The straight movement regulator 15 holds a straight movement regulator casing 3b integrated with the shutter unit disposed on the third lens holder 3. The straight movement regulator casing 3b is a casing into which the straight movement regulator 15 is inserted. The straight movement regulator casing 3b and the straight movement regulator 15 are disposed in a pair.

The straight movement regulator casing 3b includes, on an outer periphery thereof, a straight movement regulator 3c for the fourth lens holder 4. The straight movement regulator 3c regulates a straight movement regulator casing 4b provided to the fourth lens holder 4 to move straight.

The third lens holder 3 includes a straight movement regulator 13a for the second lens holder 2. The straight movement regulator 13a regulates a straight movement regulator casing 2c provided to the second lens holder 2 to move straight. The second lens holder 2 includes a straight movement regulator 2a for the first lens holder 1b. The straight movement regulator 2a regulates the first lens holder 1b to move straight.

An outer barrel 8a on the outer periphery of the movable cam ring 8 is fixed on the outer periphery of the first lens holder 1b. The outer barrel 8a is fixed on the movable cam ring 8 at three points in a snap-fit manner.

Next, a method of assembling the lens barrel 16 will be described step by step. In the present embodiment, the lens units (lens holders) are assembled and mounted to the inside of the movable cam ring 8.

First, the movable cam ring 8 is attached to the fixed cam ring 9. The movable cam ring 8 is incorporable from a back side of the fixed cam ring 9. The follower 8b provided to the movable cam ring 8 is engageable with the fixed cam groove 9a formed on the fixed cam ring 9.

Then, after the drive ring 14 is incorporated, the covering barrel 12 is attached to cover an outer periphery of the lens barrel 16, and the image pickup element holder 11 is attached to cover a back side thereof. The assembly, which is not complete at this stage, allows positions of the lens units incorporated therein to be adjusted so as to align optical axes of the lens units. Correction of inclination and decentering of the lens units is also possible for an improved optical performance. After that, the movable cam ring 8 is rotated in an extending direction to such a phase that the assembly is in the extended state. In this state, the first lens holder 1b that is an outer lens unit of the movable cam ring 8 is attached to the assembly, and the barrier unit 1 is also attached thereto.

Then, the movable cam ring 8 is rotated in a retracting direction and moved to a mechanical end of the first lens holder 1b. In this state, the outer barrel 8a is attached to the outer periphery of the first lens holder 1b and the movable cam ring 8.

The barrier unit 1 includes barrier blades 1d at a front thereof. As illustrated in FIG. 1B, when the lens barrel 16 is in an image capturing state (image capturing standby state), the barrier blades 1d are open. On the other hand, as illustrated in FIG. 1A, when the lens barrel 16 is in the retracted state, the barrier blades 1d are closed. To enable the barrier blades 1d to be closed when the lens barrel 16 is retracted, the first lens unit 1a is positioned away from the barrier blades 1d. On the other hand, at image capturing, the barrier unit 1 and the first lens holder 1b are positioned close to each other and the first lens unit 1a is inserted in an opening formed by the barrier blades 1d.

Such a configuration can minimize the opening of the barriers of the barrier unit 1. A configuration in which the barrier unit 1 and the first lens holder 1b are moved along cam loci different from each other leaves space in front of the barrier unit 1 when the lens barrel 16 is retracted. This causes the movable cam ring 8 disposed behind the first lens holder 1b to have a shortened length along the optical axis OA (optical axis length). A cam groove formed on the movable cam ring 8 having a short optical axis length would provide a short stroke and thus could not achieve sufficient optical magnification.

In the present embodiment, the first lens holder 1b includes openings 1c formed at three points. The movable cam ring 8 includes angled cam protrusions 8c formed at a front thereof. The cam protrusions 8c of the movable cam ring 8 are configured to be inserted into the openings 1c of the first lens holder 1b. The cam protrusions 8c have cam grooves formed thereon. This allows the configuration of the present embodiment to achieve a longer stroke around the movable cam ring 8 (cam stroke) as compared to a configuration in which the movable cam ring 8 is disposed directly behind the first lens holder 1b without the cam protrusions 8c.

In the present embodiment, the cam protrusions 8c each includes, on an inner periphery thereof, a second cam groove 8d that the second lens holder 2 follows. In the present embodiment, three second cam grooves 8d are formed at substantially equal intervals of 120 degrees and are disposed at a wide-angle end of the lens barrel 16. In other words, when following the second cam grooves 8d at the wide-angle end, the second lens holder 2 is most protruded from the movable cam ring 8.

On the other hand, the second lens holder 2 is most inserted in the movable cam ring 8 when the lens barrel 16 is retracted. The first lens holder 1b is regulated to move straight by the straight movement regulator 2a integrated with the second lens holder 2. The straight movement regulator 2a protrudes in a radial direction from the outer periphery of the movable cam ring 8 and is engaged with the first lens holder 1b. The movable cam ring 8 includes three cam recesses 8e (concave portions) formed at positions respectively corresponding to the three cam protrusions 8c. In the retracted state, the straight movement regulators 2a are inserted in the cam recesses 8e. Such a configuration can achieve a longer stroke (cam stroke) of the movable cam ring 8, which enables the second lens holder 2 and the first lens holder 1b to be coupled straight.

In the present embodiment, a barrier mechanism built in the barrier unit 1 is configured to be closed in the retracted state of the lens barrel 16 and to be open in the extended state (at image capturing). In the retracted state, the barrier blades 1d are closed and the cam protrusions 8c formed on the movable cam ring 8 are inserted in a formed space. On the other hand, when the lens barrel 16 is in the extended state, the movable cam ring 8 is moved away from the barrier unit 1 and the cam protrusions 8c are retracted from the formed space in the barrier unit 1, thereby allowing the barrier blades 1d to open. In this manner, the configuration of the present embodiment achieves an effective use of space in the lens barrel 16.

The present embodiment is also applicable to a case where the first lens holder 1b and the barrier unit 1 are not separately disposed but the barrier mechanism is integrally incorporated in a front side of the first lens holder 1b. With this configuration, the first lens holder 1b and the barrier unit 1 are not moved relative to each other, but the cam protrusions 8c are inserted in the openings 1c formed on the first lens holder 1b in the retracted state.

As described above, in the present embodiment, the first lens holder 1b is provided with the openings 1c into which at least part of the movable cam ring 8 is insertable. It is preferable that at least the part of the movable cam ring 8 is configured to penetrate the openings 1c of the first lens holder 1b.

It is also preferable that the lens barrel 16 further includes the barrier unit 1 including the barrier blades 1d. When the lens barrel 16 is in the retracted state, the barrier blades 1d are closed and at least the part of the movable cam ring 8 is inserted in the openings 1c of the first lens holder 1b. It is also preferable that the first lens holder 1b follows the cam groove 8f formed on the outer periphery of the movable cam ring 8 and the barrier unit 1 moves along a second locus different from a first locus of the first lens holder 1b.

It is also preferable that, when the lens barrel 16 is in the extended state, the barrier blades 1d are open to form an opening region and the first lens unit 1a is inserted in the opening region of the barrier blades 1d. It is more preferable that, in transition from the extended state to the retracted state, the first lens unit 1a is moved away from the barrier unit 1 and the barrier blades 1d are closed.

It is also preferable that the movable cam ring 8 includes the protrusions 8c configured to be inserted into the openings 1c of the first lens holder 1b. It is more preferable that the lens barrel 16 includes the second lens holder 2 holding the second lens unit 2b. The protrusions 8c of the movable cam ring 8 are provided with the second cam grooves 8d that the second lens holder 2 follows. It is more preferable that the first lens holder 1b is regulated to move straight by the straight movement regulator 2a provided to the second lens holder 2, and the movable cam ring 8 is provided with the recesses 8e (concave portions) disposed at phases (positions) different from those of the protrusions 8c when viewed in the optical axis direction. When the lens barrel 16 is in the retracted state, the straight movement regulators 2a are inserted in the recesses 8e of the movable cam ring 8.

The present embodiment can achieve a lengthened cam stroke and thus provide a lens barrel and an image pickup apparatus that are small and have high optical magnification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-253720, filed on Dec. 9, 2013, which is hereby incorporated by reference herein in its entirety.

What is claimed is:

1. A lens barrel comprising:
    a movable cam ring including a protrusion;
    a first lens holder holding a first lens unit and configured to follow a first cam groove formed on the cam ring; and
    a second lens holder holding a second lens unit, wherein:
        the first lens holder is provided with an opening into which the protrusion of the cam ring is insertable,
        the protrusion of the cam ring is provided with a second cam groove that the second lens holder follows,
        the first lens holder is regulated to move straight by a straight movement regulator provided to the second lens holder,
        the cam ring is provided with a recess disposed at a phase different from a phase of the protrusion when viewed in an optical axis direction, and
        the straight movement regulator is inserted in the recess of the cam ring when the lens barrel is in a retracted state.

2. The lens barrel according to claim 1, wherein at least the part of the cam ring is configured to penetrate the opening of the first lens holder.

3. The lens barrel according to claim 1, further comprising a barrier unit including a barrier blade, wherein the barrier blade is closed and at least the part of the cam ring is inserted in the opening of the first lens holder when the lens barrel is in a retracted state.

4. The lens barrel according to claim 3, wherein:
    the first lens holder follows the first cam groove formed on an outer periphery of the cam ring, and
    the barrier unit moves along a second locus different from a first locus of the first lens holder.

5. The lens barrel according to claim 3, wherein the barrier blade is open to form an opening region and the first lens unit is inserted in the opening region of the barrier blade when the lens barrel is in an extended state.

6. The lens barrel according to claim 5, wherein the first lens unit is moved away from the barrier unit and the barrier blade is closed in transition from the extended state to the retracted state.

7. An image pickup apparatus comprising:
    an image pickup element configured to perform photo-electric conversion on an optical image to output an image signal; and
    a lens barrel, wherein
        the lens barrel comprises:
            a movable cam ring including a protrusion;
            a first lens holder holding a first lens unit and configured to follow a first cam groove formed on the cam ring; and
            a second lens holder holding a second lens unit, wherein:
                the first lens holder is provided with an opening into which the protrusion of the cam ring is insertable,
                the protrusion of the cam ring is provided with a second cam groove that the second lens holder follows,
                the first lens holder is regulated to move straight by a straight movement regulator provided to the second lens holder,
                the cam ring is provided with a recess disposed at a phase different from a phase of the protrusion when viewed in an optical axis direction, and
                the straight movement regulator is inserted in the recess of the cam ring when the lens barrel is in a retracted state.

* * * * *